United States Patent [19]

Sturgis

[11] Patent Number: 4,823,154
[45] Date of Patent: Apr. 18, 1989

[54] FILM ADVANCING ASSEMBLY FOR SELF-DEVELOPING FILM

[75] Inventor: John I. Sturgis, Stoneham, Mass.

[73] Assignee: Polaroid Corporation, Cambridge, Mass.

[21] Appl. No.: 240,006

[22] Filed: Sep. 1, 1988

[51] Int. Cl.[4] .............................................. G03B 17/52
[52] U.S. Cl. ...................................... 354/86; 354/212
[58] Field of Search ..................... 354/83, 84, 85, 86, 354/212

[56] References Cited

U.S. PATENT DOCUMENTS

| | | | |
|---|---|---|---|
| 3,678,830 | 7/1972 | Erlichman | 354/86 |
| 3,810,211 | 5/1974 | Wareham et al. | 354/86 |
| 3,984,851 | 10/1976 | Goto | 354/212 |
| 3,987,466 | 10/1976 | Murray, Jr. | 354/83 |
| 4,165,931 | 8/1979 | Fauth et al. | 354/212 |
| 4,212,524 | 7/1980 | Douglas | 354/212 |

Primary Examiner—A. A. Mathews
Attorney, Agent, or Firm—Alfred E. Corrigan

[57] ABSTRACT

Apparatus for advancing individual photographic film units from a stack of the same and moving them to the exterior of a cassette. The film units, which are of the instant or self-developing type, each include a leading end having a rupturable container of processing liquid thereon and a relatively thin trailing end, such trailing ends being located in very close proximity when the film units are properly stacked in the cassette. The advancing apparatus includes first and second members adapted for movement toward the trailing ends of the film units which results in the first member wedging itself between an endmost film unit and an adjacent film unit in the stack in a manner which depresses the trailing end of the adjacent film unit out of the path of movement of the second member while simultaneously supporting the endmost film unit's trailing end in such path for subsequent engagement by the second member.

7 Claims, 2 Drawing Sheets

FILM ADVANCING ASSEMBLY FOR SELF-DEVELOPING FILM

BACKGROUND OF THE INVENTION

1. Field of the Invention

Photographic apparatus having means for advancing a self-developing film unit from a stack of the same located in a cassette.

2. Description of the Prior Art

The present invention relates to photographic apparatus for advancing an instant or self-developing type film unit from a film cassette toward a pair of pressure-applying members. The film units are generally stacked within the film cassette with their leading ends located adjacent to a leading end wall of the film cassette and their trailing ends located adjacent to a trailing end wall of the film cassette. A platen is located between a bottom wall of the film cassette and the bottom film unit in the stack. The platen resiliently biases the stack toward a forward wall of the film cassette having a rectangular exposure opening therein such that the uppermost (endmost) film unit has (1) its photosensitive area in alignment with the exposure opening, (2) its leading end located in alignment with an egress in the cassette's leading end wall, and (3) its trailing end located adjacent an ingress located in a portion of the film cassette where its trailing end wall joins its forward wall. Mounted adjacent to the trailing end wall of the film cassette is a film advancing apparatus having a thin cantilevered member. This member is adapted to be moved into the film cassette (subsequent to the exposure of the uppermost film unit) via the ingress, so as to engage the endmost film unit by its trailing end and advance it toward the exterior of the film cassette via the egress.

From the foregoing it can be readily seen that the thickness of and the spacing between adjacent trailing ends of the film units is an important consideration in the design of the film advancing apparatus. As the thickness of the trailing end decreases, as well as the spacing between adjacent trailing ends, there arises a problem that the film engaging member of the film advancing apparatus may ride up over the thin trailing end and thus fail to advance the film unit from the film cassette. Or, the film engaging member may engage the trailing ends of the two uppermost film units in the stack thus moving an unexposed adjacent film unit as well as an exposed endmost film unit from the film cassette.

SUMMARY OF THE INVENTION

The invention relates to photographic apparatus for sequentially advancing film units from a stack of the same, and, more particularly, to such an apparatus which is constructed to obviate the two problems set forth above. The photographic apparatus preferably takes the form of an instant or self-developing camera having means for supporting a film cassette containing a stack of instant film units in position for their sequential exposure. A film advancing assembly or apparatus including first and second members is located within the camera in a position wherein subsequent to its actuation (manual or motor driven) the members enter the film cassette via an ingress and function to move an exposed endmost film unit from the stack to the exterior of the film cassette via an egress in the cassette's leading end wall. A leading end of the exposed film unit is advanced by such film advancing assembly into the bite of a pair of pressure-applying members, preferably elongate rollers, which continue the movement of the exposed film unit away from the cassette while simultaneously rupturing a container of processing liquid associated with a leading end of the film unit and spreading its contents between layers of the film unit to initiate the formation of a visible image.

The first member of the film advancing assembly is constructed to enter the film cassette in advance of the second member. Upon entering the cassette, the first member is driven to a position between the exposed film unit, hereinafter also referred to as the endmost film unit, and the next adjacent film unit. Thus located, it maintains the trailing end of the adjacent film unit in a deflected condition (away from the endmost film unit) while simultaneously supporting the trailing end of the endmost film unit for subsequent engagement by the second member of the assembly.

The second member of the film advancing assembly is constructed such that its free end will extend to or slightly below a plane containing the bottom surface of the endmost film unit, thereby maximizing contact between its trailing end and the second member. Note, even though the free end of the second member extends to a position equal to or slightly below the endmost film unit, it will not engage the trailing end of the adjacent film unit because the latter is being held in a deflected state by the first member.

An object of the invention is to provide photographic apparatus with film advancing means which is adapted to enter a film cassette and support a trailing end of an endmost film unit in position for subsequent engagement by the film advancing means while simultaneously maintaining the trailing end of the next adjacent film unit in a deflected non-interfering position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

DETAILED DESCRIPTION OF THE INVENTION

Figure 1:
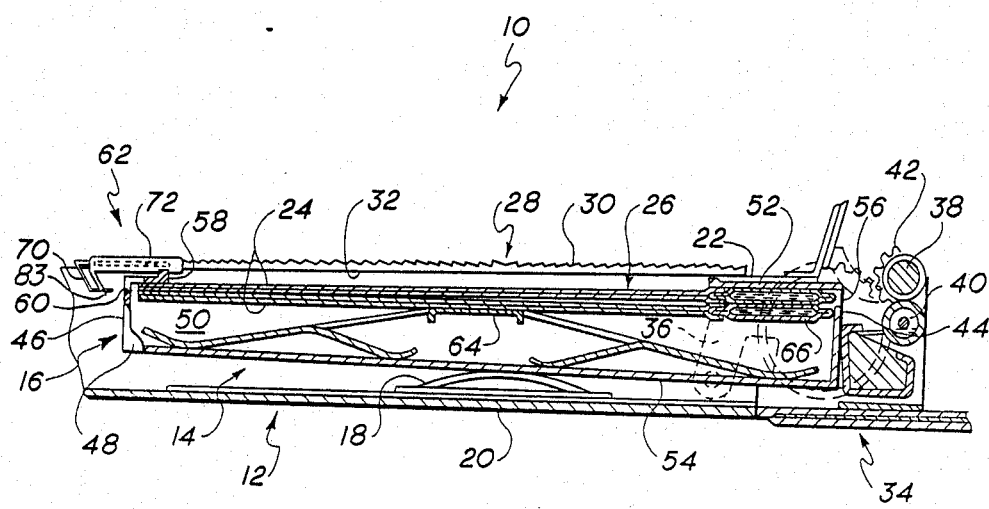
FIG. 1 is a side elevational view, in cross section, of photographic apparatus which incorporates the present invention.

Reference is now made to the drawings, and in particular to FIG. 1 wherein is shown photographic apparatus in the form of a portion of an instant or self-developing camera 10. The camera 10 includes a housing 12 having an open ended chamber 14 for receiving a film cassette 16. A spring 18, mounted on a bottom wall 20 of the housing 12, is provided for resiliently urging the film cassette 16 upwardly against a forward wall 22 of the chamber 14, thus supporting the film cassette 16 in position for the sequential exposure of a stack of instant or self-developing film units 24 contained therein. Exposure of a film unit 24 is made through an aperture 26 formed in the forward wall 22 subsequent to a member 28 being moved to an uncovering position. The member 28 includes a Fresnel viewing surface 30 on one side and an exposure taking mirror 32 on the other side.

The open end of the chamber 14 is closed by a spread roller housing 34. The housing 34 is pivotally coupled to the housing 12 by a pair of laterally spaced hinges 36 (only one being shown) for pivotal movement in a clockwise direction into a film cassette loading position. The housing 34 carries a pair of elongate cylindrically configured rollers 38 and 40 which are adapted to be driven by a motor driven gear train a portion of which includes a gear 42 on the end of the roller 38. For more particulars of the camera 10, reference should be had to U.S. Pat. No. 3,810,211 granted to R. Wareham et al. on May 7, 1984 and assigned in common herewith.

Figure 3:
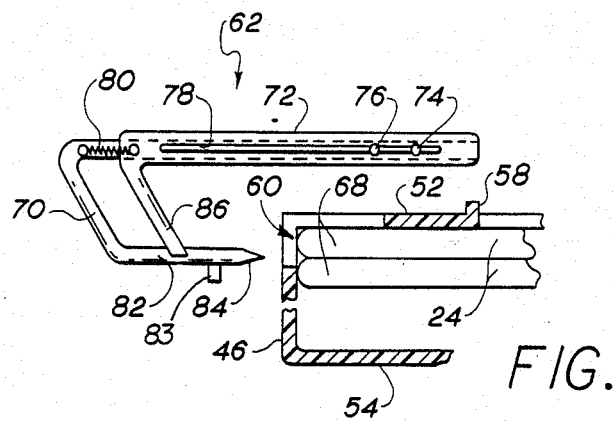
FIGS. 3-5 are enlarged side elevational views of a portion of a film cassette containing a stack of film units and its relation to the film advancing apparatus shown in FIG. 2, the views representing sequential steps in the movement of an endmost film unit toward the exterior of the film cassette.

The film cassette 16 has a generally tapered parallelepiped configuration and includes leading and trailing end walls 44 and 46 the edges of which are interconnected by a pair of side walls 48 and 50 and upper and lower walls 52 and 54, respectively. The leading end wall 44 includes an egress 56 which extends substantially across the distance between the side walls 48 and 50 and is dimensioned to permit the passage therethrough of one film unit 24 at a time. The upper wall 52 is formed with a rectangular exposure aperture defined by the four sides of an upstanding rib 58. An ingress 60 is formed in a top portion of the trailing end wall 46 and continues for a short distance along the left hand portion of the upper wall 52, as best seen in FIG. 3. The ingress 60 is adapted to be entered by portions of a reciprocally mounted film advancing system 62, as will be more fully described later.

As best seen in FIG. 1, the film cassette 16 is adapted to enclose a stack of instant film units 24, only two being shown for reasons of clarity. The uppermost film unit in the stack will hereinafter be referred to as "the endmost film unit" while the underlying film unit will be referred to as "the adjacent film unit." The stack of film units 24 are resiliently biased upwardly by a platen 64 such that the endmost film unit 24 has (1) its photosensitive area located in alignment with the exposure aperture defined by the rib 58, (2) its leading end which carries a container 66 of processing liquid aligned with the egress 56, and (3) its trailing end 68 located adjacent the trailing end wall 46.

The film units 24 are adapted to be sequentially removed from the film cassette 16 subsequent to their exposure by actuation of the film advancing system 62. The system 62 includes first and second members 70 and 72, respectively. The first member 70 includes a pair of pins 74 and 76 which are suitably secured within an elongate slot 78 in the second member 72 to permit relative sliding movement of the first and second members 70 and 72 toward and away from each other. A spring 80 has its opposite free ends secured to the members 70 and 72 so as to bias them toward each other, i.e., into the position shown in FIGS. 2 and 3.

Figure 2:
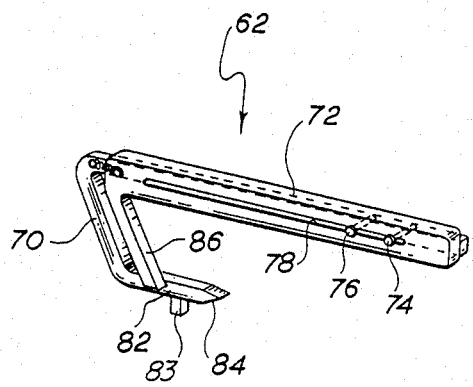
FIG. 2 is an enlarged perspective view of a portion of a film advancing apparatus.

The first member 70 includes a forwardly extending, slender portion 82 having a tapered end 84. The second member 72 includes a downwardly extending member 86 whose terminal end is located rearwardly of the tapered end 84 when the film advancing system 62 is at rest, as shown in FIGS. 1 and 2.

Figure 4:
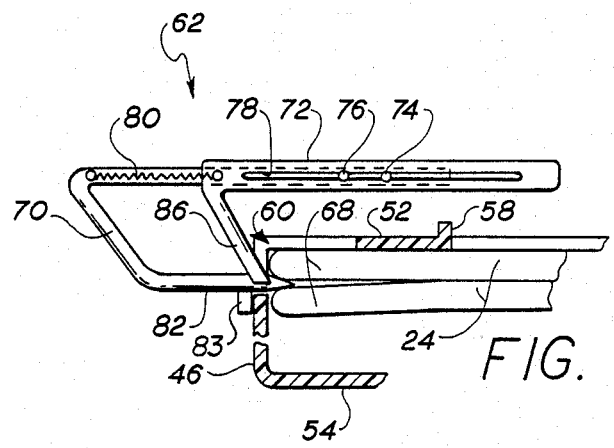
Figure 5:
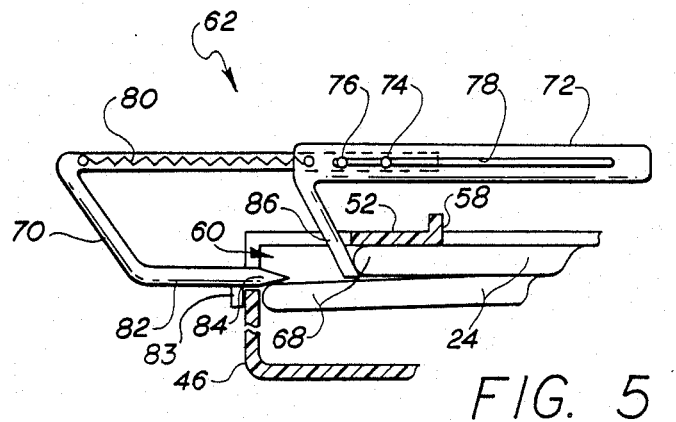

In the operation of the invention, the image of the subject is focused on the Fresnel 30 and the camera's shutter release button (not shown) is depressed to initiate an exposure cycle. The member 28 is pivoted upwardly in a counterclockwise direction to a position wherein it uncovers the exposure aperture 26 in the film cassette 16. The camera's shutter is then opened and image bearing light enters the camera 10 and is reflected by the mirror 32 onto the photosensitive surface of the endmost film unit 24. Upon completion of the exposure, the member 28 is driven back to the position shown in FIG. 1 and the drive (not shown) to the film advancing system 62 and to the roller 38 is started. The second member is driven to the right, as viewed in FIG. 3, and, by virtue of the spring 80, draws the first member along with it. Eventually, the tapered end 84 of the first member 70 enters the ingress 60 in the cassette's trailing end wall 46 and wedges itself between the trailing ends 68 of the two uppermost film units 24 in the stack, i.e., between the trailing ends of the exposed endmost film unit and the adjacent film unit. Thus positioned, the tapered end 84 of the first member 70 holds the trailing end 68 of the adjacent film unit 24 in a deflected state, as shown in FIG. 4, wherein it is located out of the path of travel of the member 86 while simultaneously supporting the trailing end 68 of the endmost film unit 24 in such path of travel. Suitable means, such as a downwardly extending flange 83 on the member 82, may be provided for engaging the trailing end wall 46 to limit the degree of penetration of the member 82 into the film cassette 16 to that shown in FIGS. 4 and 5.

Continued movement of the second member 72 to the right results in its member 86 engaging the trailing end 68 of the endmost film unit and advancing it, leading end first, out of the film cassette 16 via the egress 56 and into the bite of the rollers 38 and 40. The rollers 38 and 40 continue the movement of the exposed film unit 24 away from the film cassette 16 while simultaneously rupturing the container 66 of processing liquid and spreading its contents between layers of the film unit to initiate the formation of a visible image. When the leading end of the exposed film unit enters the roller gap, the drive to the second member 72 is withdrawn and any suitable means such as a spring may be used to return the second member 72 to its original position. As it approaches its original position, the right hand end of the slot 78 engages the pin 74 and thus continued movement of the second member 72 to the left results in a similar movement by the first member 70.

Since certain changes may be made in the above described apparatus without departing from the scope of the invention herein involved, it is intended that all matter contained in the above description or shown in the accompanying drawings shall be interpreted as illustrative and not in a limiting sense. For example, while it has been described with reference to a film unit being exposed within a film cassette, such exposure may occur after being advanced from the film cassette and prior to being moved into the gap of a pair of spread rollers.

What is claimed is:

1. Photographic apparatus for use with a cassette of the type having a stack of self-developing film units located therein with leading ends thereof located adjacent a leading end wall of the cassette having a film egress therein and trailing ends thereof located adjacent a trailing end wall of the cassette having an ingress therein through which a film advancing means may enter the cassette for removal of an endmost film unit in the stack, said photographic apparatus comprising: means for supporting the cassette; and film advancing means including first and second means mounted adjacent the trailing end wall of the cassette for movement in first and second directions toward and away from, respectively, the trailing end wall, said first means, when moved in said first direction, being adapted to enter the cassette via the ingress in its trailing end wall and wedge itself between the trailing ends of an endmost film unit in the stack and an adjacent film unit in a manner which deflects the trailing end of the adjacent film unit out of a path of travel of said second means while simultaneously supporting the trailing end of the endmost film unit in position to be engaged by said second means, and said second means being constructed when moved in said first direction, to subsequently enter the cassette via the ingress and engage the trailing end of the endmost film unit and move it toward the exterior of the cassette via its egress.

2. Photographic apparatus as defined in claim 1 wherein said first and second means are separate independent members and said photographic apparatus further includes means for coupling said first and second means to each other for relative movement.

3. Photographic apparatus as defined in claim 2 wherein said coupling means comprises a pin and slot connection.

4. Photographic apparatus as defined in claim 2 further including means for biasing said first and second means toward each other.

5. Photographic apparatus as defined in claim 4 wherein said first means includes a stop for engaging the trailing end wall of the film cassette as it wedges itself between the trailing ends of the endmost and adjacent film units whereby said first means may remain stationary when so positioned while said second means continues its movement toward engagement with the trailing end of the endmost film unit.

6. Photographic apparatus as defined in claim 4 wherein said first and second means are mounted in side-by-side relation.

7. Photographic apparatus as defined in claim 1 wherein said second means includes an end portion which extends to a position just below or substantially equal to a plane containing the lower surface of the endmost film unit.

* * * * *